Oct. 11, 1932.    B. F. RANDEL    1,882,251
REFRIGERATING APPARATUS
Filed June 19, 1929    2 Sheets-Sheet 1
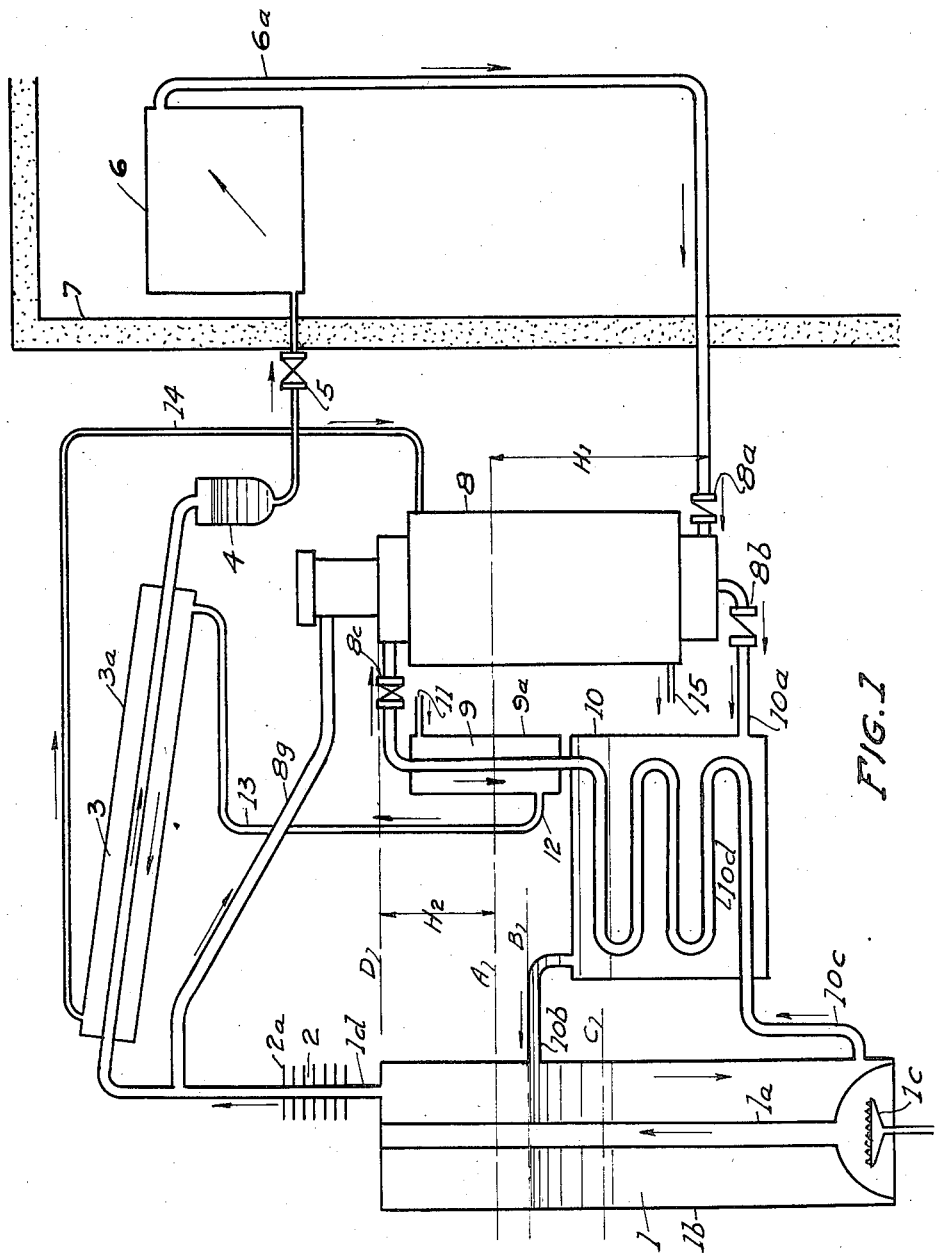
INVENTOR.
Bo Folke Randel

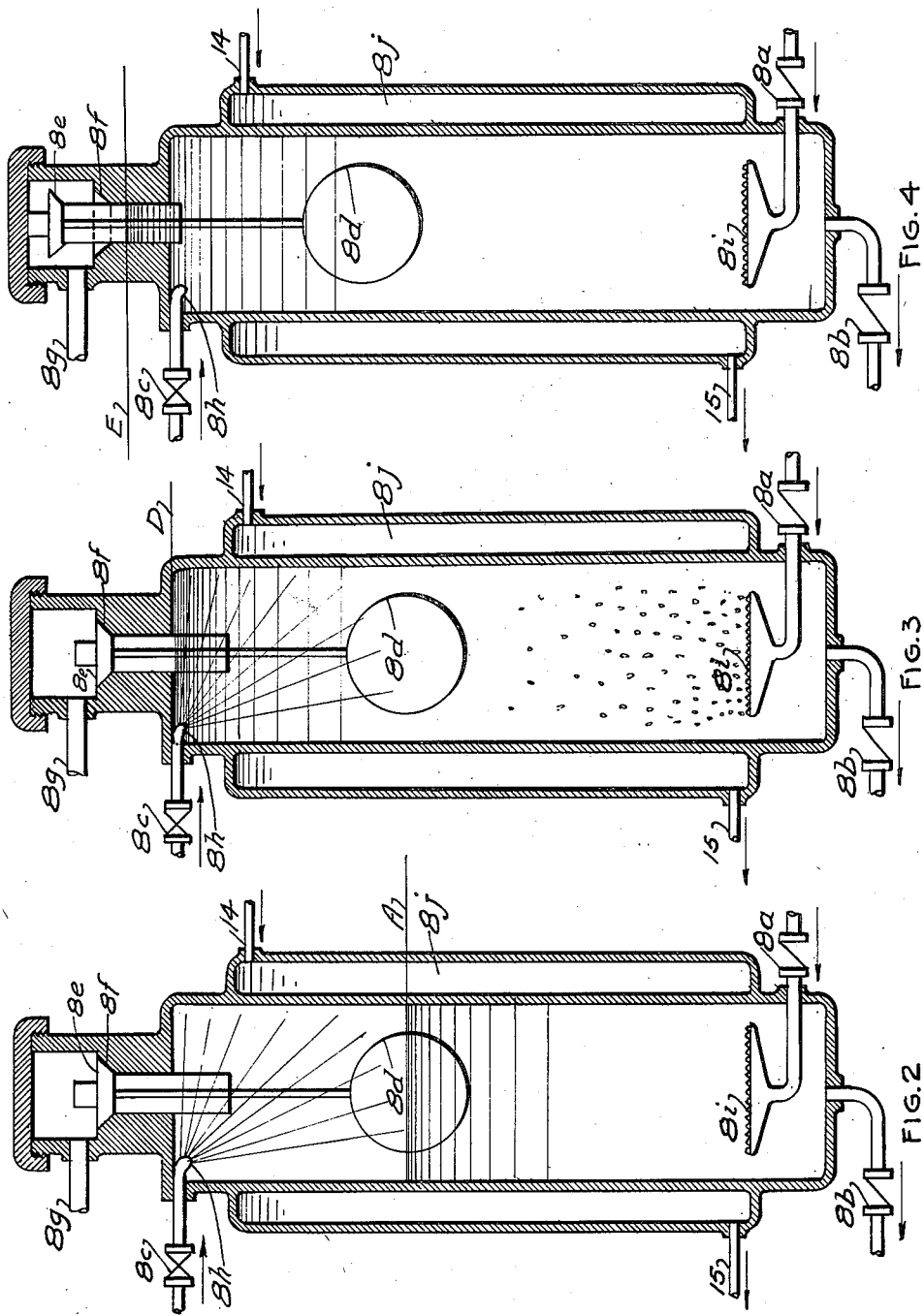

Patented Oct. 11, 1932

1,882,251

UNITED STATES PATENT OFFICE

BO FOLKE RANDEL, OF SAN DIEGO, CALIFORNIA

REFRIGERATING APPARATUS

Application filed June 19, 1929. Serial No. 372,081.

My invention relates to refrigerating apparatus of the absorption type and the objects thereof are: First, to provide circulation of the mediums without the use of a mechanically driven pump; second, to create low pressure in the low pressure side of the apparatus by causing absorption of a refrigerating medium in an absorption medium; third, to create high pressure in the high pressure side of the apparatus by the application of heat to a solution of the refrigerating medium in the absorption medium vaporizing the refrigerating medium out of the solution, fourth, to alternately equalize the low and high pressures in a vessel separating the low and high pressure sides of the apparatus, thus causing circulation from the low pressure side to the high pressure side.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part in this application in which:

Fig. 1 is a diagrammatical view of the apparatus employed in my refrigerating system and Figures 2, 3 and 4 are detail views of my absorber and pressure equalizer showing positions of parts during the operation of same.

Similar characters of reference refer to similar parts and portions throughout the several views of the drawings. Arrows indicate direction of flow.

The generator 1, analyzer 2, condenser 3, liquid gas receiver 4, expansion valve 5, evaporator 6, refrigerator 7, absorber and pressure equalizer 8, weak liquor cooler 9 and heat economizer 10 constitute the principal parts and portions of my refrigerating apparatus.

Generator 1 may be constructed as shown with center flue 1a enclosed in shell 1b and with gas burner 1c, or it may be constructed in any conventional way and heated with any heating medium, the object of said generator being to vaporize a refrigerating medium out of an absorption medium by the application of heat.

Analyzer 2, which purpose is to condense any vapors of the absorption medium which may have formed in generator 1, and which accompany vapors of the refrigerating medium through the discharge pipe 1d, may be constructed with cooling fins 2a as shown or in any conventional way such analyzers are constructed in when parts of absorption apparatus.

From analyzer 2 vapors of the refrigerating medium are led to condenser 3, here shown with cooling jacket 3a, allowing a cooling medium to flow in contrary direction, thus cooling and condensing the vapors. Condenser may be constructed in any coventional manner allowing for air or water cooling.

The liquefied gas is led into liquid gas receiver 4 and from here through expansion valve 5 to evaporator 6 enclosed in refrigerator 7. Liquid receiver 4, expansion valve 5 and evaporator 6 may be constructed along any conventional lines now used in refrigerating apparatus. Evaporator 6 is kept under low pressure, allowing expansion and evaporation of the liquefied gas.

In order to maintain a certain low pressure in evaporator, expansion valve 5 may be constructed along the lines of pressure reducing valves, closing when a predetermined pressure is reached in evaporator.

From evaporator, after performing the work of refrigeration, the now vaporized refrigerating medium is led through pipe 6a and check valve 8a to absorber and pressure equalizer 8. This absorber and pressure equalizer is shown in detail in Figs. 2, 3 and 4, and the action in same will be explained later.

From absorber rich liquor is led through pipe 10a and check valve 8b to heat economizer 10, thence through pipe 10b back to generator 1. In this generator the refrigerating medium is vaporized and the resulting weakened liquor is led through pipe 10c into coil 10d inside heat economizer 10, where it imparts its heat to the rich liquor in said economizer, thence through weak liquor cooler 9, where it is cooled in any conventional way by water as shown in jacket 9a or by air if desired. Thence through regulating valve 8c into absorber 8.

It is assumed that the cooling medium is water (air, however may be used). Cooling water enters at 11 and passes through weak liquor cooler 9, discharging at 12. Thence through pipe 13 to condenser 3 discharging through pipe 14 to absorber 8, finally discharging at 15.

It is assumed that the temperature of the water is 65 degrees in weak liquor cooler 9, 85 in condenser 3, and 120 in absorber 8. It is also assumed that the temperature of the mediums cooled is 5 degrees higher in each case, or 70, 90 and 125 degrees in the parts mentioned.

It is assumed that the mediums used are ammonia gas as refrigerating medium and water as absorption medium, also that the circulation through the apparatus is adjusted so as to maintain 20 and 30 percent concentrations.

It is well known that temperature, vapor pressure and concentration of ammonia absorbed in water are interdependent, so that with two of the factors given, the third is a necessary complement. Vapor pressure of a 20% solution of ammonia and water at a temperature of 70 degrees is therefore less than 10 pounds absolute, and of 30% solution at a temperature of 125 degrees is approximately 34 pounds absolute.

It is also a well known fact that the vapor pressure of a liquefied gas is a function of the temperature. By maintaining a 180 pound absolute pressure in generator and a 90 degree temperature in condenser, ammonia vapor will condense and liquefy and will collect in liquid form in receiver.

The operation of my apparatus is now as follows: The apparatus is charged with predetermined quantities of ammonia gas and water and then sealed. It is assumed that liquid in absorber 8 stands at line A, and in generator 1 at line B. The heat economizer 10 is entirely filled with liquid and so is coil 10d up to level A. It is assumed that liquid is rich liquor and that the space above liquid level is filled with ammonia gas under pressure and with a small part ammonia liquid in receiver 4.

Under this condition float 8d, Fig. 2, is in down position holding valve 8e closed against valve seat 8f.

Heat is now applied to generator 1 vaporizing the ammonia out of the absorption medium water. Ammonia vapor will pass through analyzer 2, where any water vapor formed will condense and flow back to generator 1. Pressure in generator will increase and force the liquid up through coil 10d, through regulating valve 8c into absorber 8 as soon as head H2 is overcome. It is impossible for the increased pressure in generator to act in any other direction, the check valve 8b and valve 8e in absorber preventing flow to absorber through pipes 10a and 8g.

It is seen that liquid entering absorber through valve 8c is weak liquor and is at a temperature of 70 degrees, having been cooled down, first in heat economizer 10 by imparting its heat to the liquid surrounding coil 10d and then in cooler 9 by the cooling medium.

Now when this weak liquor at the temperature of 70 degrees enters absorber into an atmosphere of ammonia vapor a sudden absorption of this vapor will occur with a sudden drop of pressure in this absorber above the liquid surface A. To assist in this absorption, liquid is allowed to spray into the vapor through a suitable spray 8h. Valve 8c is also adjusted so that no more weak liquid is admitted than is needed to maintain the low pressure, which in this case was shown to be less than 10 pounds absolute under the stated conditions.

The reduction of pressure in absorber will have two results. First, further tightening of valve 8e against seat 8f, there being a pressure of 180 pounds per sq. in. against valve with less than 10 pounds per sq. in. in opposite direction. And second, if expansion valve 5 is adjusted so as to maintain, say 34 pounds pressure in evaporator, the head H1 will be overcome causing a flow of low pressure gas from evaporator 6 through 6a, check valve 8a, through perforated screen 8i, thence in bubbles through liquid in absorber. In bubbling through the liquid, the ammonia gas will be re-absorbed, forming rich liquor in absorber corresponding to temperature maintained by cooling medium in jacket 8j.

During this phase of the cycle the inflowing liquid will slowly fill absorber up to level D. Float however will not rise, due to the pressure against valve 8e. Condition in absorber will now be as shown in Fig. 3.

The absorber will be nearly filled with liquid. Float will be held in down position and valve 8e closed. Liquid will continue to flow into absorber from generator, due to the difference of pressures, but as no further space exists for absorption of vapors, the pressure in absorber will increase until near equalization of pressures in absorber and generator takes place.

As soon as pressure in absorber rises above pressure in evaporator check valve 8a will close and prevent this higher pressure to communicate itself to evaporator. But with the pressures in absorber and generator nearly equalized the valve 8e will be in position to be easily opened by the rising of float to high position. The conditions in absorber will now be as shown in Fig. 4.

With valve 8e fully opened, the pressure will be entirely equalized, allowing liquid in absorber to flow by gravity back to generator, the equalization taking place by ammonia vapors passing from generator to absorber through equalization pipe 8g.

When level A is reached, float will again cause the closing of valve 8e stopping further inflow of ammonia gas through equalizing pipe 8g. This level is kept slightly higher than level B in generator so as to produce a slightly lower pressure in absorber than in generator during this phase of the cycle so as to maintain valve 8e closed before weak liquid is again allowed to spray into absorber. The condition in absorber is now as shown in Fig. 2, thus completing the cycle.

From the above description it is seen, that I cause a positive flow from the low pressure of evaporator to the high pressure of the generator, by alternatively equalizing the pressures in an absorber between the evaporator and generator.

Though I have described a particular apparatus and agents for obtaining refrigeration, I do not wish to be limited to this particular apparatus and these agents, but desire to include within the scope of my invention the apparatus and mediums or agents as set forth in the appended claims.

Having thus described my invention, what I claim as new and desire to secure by Letters Patent is:

1. In a refrigerating apparatus, a circulating system containing a solution of a refrigerating medium in an absorption medium, means for causing said refrigerating medium to vaporize out of the said absorption medium, means for condensing said vapor to liquid form, means for expanding said liquid to vapor form with resulting refrigeration effect, means for reabsorbing said expanded vapor into first mentioned absorption medium, thereby creating a low pressure on the refrigerating medium, communication means between said absorption means and said vaporizing means to allow liquid to flow from the latter to the former, other similar means to allow vapor to flow from the latter to the former, and a valve in said means to open by a float at the moment the pressures in said absorption means and said vaporizing means are substantially equalized.

2. In an absorption type refrigerating apparatus a pressure equalizing mechanism between high and low pressure sides of the apparatus, said pressure equalizing mechanism comprising a valve in a vapor connection between a generator and an absorber, said valve being actuated by the raising of the liquid level in said absorber and being arranged to open at the moment when the pressure in said absorber substantially equals the pressure in said generator.

3. In a refrigerating apparatus of the class described, a combination absorber and return trap placed between high and low pressure sides of the apparatus and means in said absorber to cause flow of liquid from said absorber to said high pressure side by the opening of a valve at the moment when the pressure in said absorber substantially equals the pressure in said high pressure side, said valve being placed in a vapor connection between said absorber and said high pressure side.

4. In a refrigerating apparatus of the class described, a combination absorber and return trap placed between high and low pressure sides of the apparatus, a float operated valve in said combination absorber and return trap controlling the inlet of vapor from the high pressure side, said valve being arranged to open when substantial equalization of pressures between said trap and said high pressure side of the apparatus has been reached.

5. In a refrigerating apparatus of the class described, comprising a generator, a condenser, an expansion valve, a cooling element and an absorber and having a high pressure circuit comprising the generator and the condenser, a low pressure circuit comprising the cooling element and wherein the absorber interconnecting the two circuits serves as a return trap causing flow of fluids by gravity from the said absorber to the said generator, a connection between said absorber and the vapor space of said generator, a float operated valve in said connection said valve opening at the moment pressure in said absorber substantially equals the pressure in said generator.

6. In a refrigerating apparatus of the absorption type, a combination absorber and pressure equalizing chamber between the low and high pressure sides of the apparatus, in which chamber the pressures are alternately equalized, said chamber containing a float operated valve being arranged to open at the moment the pressure in said chamber substantially equals the pressure in said high pressure side thus establishing complete equalization of pressures and enabling liquid in said chamber to pass from said chamber to said high pressure side by gravity.

7. In a refrigerating apparatus of the class described, a moving mechanism in a connection between an absorber and a generator, said moving mechanism operated by a float in said absorber and causing a flow of liquid from the absorber to the said generator and being arranged to operate at the moment pressures in said absorber and said generator are substantially equalized.

In testimony whereof, I have hereunto set my hand at San Diego, California, this 10th day of May, 1929.

BO FOLKE RANDEL.